United States Patent Office 3,256,227
Patented June 14, 1966

3,256,227
MASTICATION OF RUBBER IN THE PRESENCE OF AN ORGANIC PEROXIDE AND AN IRON SALT OF A FATTY ACID
Gerard Kraus, Bartlesville, Okla., assignor to Phillips Petroleum Company, a corporation of Delaware
No Drawing. Filed Oct. 29, 1962, Ser. No. 233,862
14 Claims. (Cl. 260—23.7)

This invention relates to an improvement in the masticating of rubber. In another aspect, it relates to an improved process for masticating rubber, such as natural rubber and rubbery polymers of 1,3-butadiene, through the use of a novel class of peptizing agents. In another aspect, it relates to improved processable rubber compositions, and to the vulcanized compositions thereof.

In the manufacturing operations for producing vulcanized rubber articles, it is the usual practice to subject the unvulcanized rubber to mastication, mechanical working, or milling in the presence of air or oxygen to change the rubber to a more soft, pliable condition prior to molding or shaping the rubber and vulcanizing the same. This mastication, for example on a roll mill, internal mixer, or screw plasticator, breaks the tenacity of the rubber and the degree to which it is broken down is influenced by the time, temperature and the vigor of the mechanical working. With some types of rubber the desired changes can be achieved only under prolonged treatment which is frequently accompanied by detrimental changes in the properties of the vulcanizates. In order to reduce the time and power required to improve the processability of the rubber and prevent deterioration of the rubber resulting from extended milling operations, it is a common practice to incorporate into the rubber a peptizing or chemical plasticizing agent which accelerates the effect of the mechanical working of the rubber and facilitates incorporation of compounding ingredients such as carbon black and other reinforcing agents, accelerators, vulcanizing agents, etc. Many of the peptizing agents used heretofore have given some improvement in the processability of the rubber, but many of these agents must be used in fairly large amounts to bring about satisfactory acceleration in the process of the rubber, some give rise to disagreeable odor or odor development in the rubber, while others are toxic while in contact with the skin or inhaled.

Accordingly, an object of this invention is to improve the processing, mechanical working, or mastication, of unvulcanized rubber, such as natural rubber, and synthetic rubbery polymers of conjugated dienes, particularly 1,3-butadiene, by incorporating into the rubber to be masticated one or more members of a novel class of peptizing agents. Another object is to provide improved processable rubbers which can be masticated or mechanically worked in a relatively short time and with low power requirements. A further object is to provide improved vulcanized rubber compositions prepared by vulcanizing such improved rubber compositions. Further objects and advantages of this invention becomes apparent to those skilled in the art from the following discussion and appended claims.

I have discovered that the mastication or mechanical working of unvulcanized rubbers can be improved by incorporating into such rubbers one or more of a novel class of peptizing agents, namely the class comprising the iron salts of fatty acids.

The iron salts of fatty acids used as peptizers in this invention include both the ferrous and ferric salts of saturated and unsaturated fatty acids, though ferric salts are preferred. The fatty acids generally can have 8 to 30 carbon atoms per molecule, preferably 8 to 20 carbon atoms per molecule. The iron salts of fatty acids with 18 carbon atoms per molecule are especially preferred since fatty acids with 18 carbon atoms are commercially available from many sources. Representative peptizers useful in the practice of this invention include the ferrous and ferric salts of caproic, caprylic, capric, lauric, myristic, palmitic, stearic, arachidic, palmitoleic, oleic, ricinoleic, petroselinic, vaccenic, linoleic, linolenic, elostearic, licanic, parinaric, and the like, including mixtures thereof. The preferred peptizer used in this invention is iron stearate, particularly ferric stearate.

The peptizing agents of this invention can be employed in relatively low amounts and do not create an odor problem in handling or use. The peptizing agent is incorporated into the rubber and the mixture milled or masticated in a conventional rubber masticator or mixer in the presence of air or oxygen, the mixing time being dependent to some extent on the vigor of the mixing action. Mastication of the rubber in the presence of the peptizing agents of this invention can take place prior to compounding with conventional compounding ingredients, or can take place in the presence of such compounding ingredients. It is also within the scope of this invention to carry out the mastication in the presence of the peptizing agents of this invention together with so-called "physical plasticizers," such as aromatic oils.

The amounts of the iron salts of fatty acids to be used in this invention can vary and will be dependent upon such factors as the particular rubber being milled, the milling temperature, and whether other plasticizers and compounding ingredients are present. Stated functionally, the amount of peptizing agent used will be an amount sufficient to improve the breakdown of the rubber. Generally, the amount of the peptizing agent used in this invention will be in the range of 0.003 to 0.1 part by weight of iron per 100 parts rubber, preferably in the range of 0.009 to 0.075 part by weight of iron per 100 parts rubber. Generally, the mastication will be carried out in the range of 3 to 10 minutes. The temperature of the mastication can vary but generally will be above 100° C. and preferably at least 110° C., the peptizing action being relatively slow at lower temperatures. Temperatures up to 250° C. can be used.

It is also within the scope of this invention to employ along with the novel peptizing agents of this invention other conventional peptizing agents.

I have also found that the peptizing action of the novel peptizing agents of this invention can be improved to a certain extent for some rubbers, such as cis-polybutadiene, by also incorporating organic peroxides. Such peroxides aid in the breakdown of the rubber and improve the general milling operation. When such peroxides are used in conjunction with the iron salts of this invention, the amount of the organic peroxide used will generally be in the range sufficient to provide from 0.004 to 0.05, preferably from 0.01 to 0.04, part by weight of peroxy oxygen (—O—O—) per 100 parts rubber, with the amount of iron salt preferably exceeding that of the peroxy oxygen, i.e., the weight ratio of the iron in the iron salt to peroxy oxygen in the peroxide generally being at least 1.5:1.

The organic peroxides which can be used in conjunction with the iron salts of this invention are well known and can be represented by the general formulas R—O—O—R or R—O—O—H (the latter generally being known as hydroperoxides but included in the term "organic peroxides" as used herein, unless otherwise noted) where R is selected from the group consisting of an acyl radical, a saturated acylic radical, an olefinically unsaturated acyclic radical, a saturated cyclic radical, an olefinically unsaturated cyclic radical, and an aromatic radical, and wherein said R radical can be substituted with a member selected from the group consisting of a halogen, a hydroxy radical and a R'O— radical, wherein R' is selected from the group consisting of an acyl radical, a saturated acyclic radical, an olefinically unsaturated acyclic radical, a saturated cyclic radical, an olefinically unsaturated cyclic radical, and an aromatic radical. It is to be understood that mixed compounds can be used, e.g., organic peroxides in which one of the oxygens of the peroxy group is joined to a hydrocarbon group, such as alkyl or cycloalkyl, while the other oxygen is joined to an acyl group. Peroxy compounds which are half-esters or diesters of dicarboxylic acids are also applicable as well as monoperoxy compounds derived from the dicarboxylic acids. Examples of suitable peroxides include the following: methyl n-propyl peroxide, diethyl peroxide, ethyl isopropyl peroxide, di-tert-butyl peroxide, di-n-hexyl peroxide, n-hexyl n-decyl peroxide, dieicosyl peroxide, dicyclohexyl peroxide, dicyclopentyl peroxide, bis(2,4,6-trimethylcyclohexyl) peroxide, bis(3,5-dichlorocyclohexyl) peroxide, bis(4-phenylcyclohexyl) peroxide, bis(2-cyclohexenyl) peroxide, bis(4-methyl-2-hexenyl) peroxide, bis(4-octenyl) peroxide, diacetyl peroxide, dipropionyl peroxide, dilauroyl peroxide, dibenzoyl peroxide, dicrotonyl peroxide, dibenzyl peroxide, dicumyl peroxide, methyl 2-n-propyl-3-butenyl peroxide, bis(alpha-ethylbenzyl) peroxide, bis[diisopropyl-(4-isopropylphenyl)methyl] peroxide, bis[dimethyl-(4-tert-butylphenyl)methyl] peroxide, benzyl alpha-methylbenzyl peroxide, bis[(4-chlorobenzoyl)] peroxide, bis(2,4-dichlorobenzoyl) peroxide, bis(2-propoxy-n-hexyl) peroxide, n-pentyl 5,8-diphenyldodecyl peroxide, bis(9,10-dihydroxydecyl) peroxide, 2,5-bis(tert-butylperoxy)-2,5-dimethylhexane, bis(2-hydroxyheptyl) peroxide, tert-butyl hydroperoxide, dodecyl hydroperoxide, eicosyl hydroperoxide, triacontanyl hydroperoxide, 4-methylcyclohexyl hydroperoxide, phenylcyclohexane hydroperoxide, 3-cyclohexenyl hydroperoxide, 3-phenyl-2-cyclohexenyl hydroperoxide, 4-cyclopentyl-n-butyl hydroperoxide, cumene hydroperoxide (dimethylphenylhydroperoxymethane), diisopropylbenzene hydroperoxide [dimethyl-(4-isopropylphenyl)hydroperoxymethane], (4 - ethoxyphenyl)methyl hydroperoxide, di-n-hexyl-4-hydroxyphenylhydroperoxymethane, dimethyl (3-methoxyphenyl)hydroperoxymethane, peroxybenzoic acid, peroxybutyric acid, peroxydodecanoic acid, tert-butyl peroxybenzoate, di-tert-amyl diperoxyphthalate, tert-dodecyl peroxyacetate, the OO-tert-butyl half ester of peroxymaleic acid

[HOOC—CH=CH—CO—O$_2$—C(CH$_3$)$_3$]

and the OO-n-amyl half ester of peroxyphthalic acid. Peroxides formed by the oxidation of terpene hydrocarbons such as pinene, alpha-pinene, p-methane, and turpentine can also be used. The peroxides which are preferred in this invention are those which decompose at a comparatively low temperature, e.g., at a temperature in the range of 250 to 350° F., and the preferred peroxide is cumene hydroperoxide.

The iron salts of this invention are of particular value in improving the mastication, mechanical working or processing of rubbers which are difficult to break down under conventional masticating operations. In particular, they can be used to improve the processability of synthetic rubbers of 1,3-butadiene.

The rubbers which can be treated by my invention include natural rubber and synthetic rubbery polymers of conjugated dienes. Such conjugated dienes normally contain from 4 to 12 carbon atoms per molecule and those containing from 4 to 8 carbon atoms are preferred. Examples of such conjugated dienes include 1,3-butadiene, isoprene, piperylene, 1,3-octadiene, 4,5-diethyl-1,3-octadiene and the like. The polymers of conjugated dienes include not only the homopolymers of these dienes and copolymers of the dienes with each other but also copolymers of conjugated dienes in major amount with other copolymerizable monomers such as styrene, 1-vinylnaphthalene, 2-methyl-5-vinylpyridine, methyl methacrylate, acrylonitrile, and the like. My invention is particularly valuable and I prefer to practice it with polybutadienes having relatively high cis configuration, and the term "cis-polybutadiene" is used herein and in the appended claims to mean a polybutadiene polymer in at which at least 75 percent, preferably at least 85 percent, of the polymer is formed by 1,4-addition of 1,3-butadiene and has the cis configuration. Polybutadienes of this type are frequently produced having inherent viscosities between 2.3 and 3.0 and it is highly desirable that such polymers be treated in order to reduce their inherent viscosity to a value in the range of about 1.7 to 2.3 for the sake of improved processability.

Inherent viscosity is determined by placing 0.1 gram of polymer in a wire cage in 100 milliliters of toluene and allowing the polymer to stand at room temperature (about 25° C.) for 24 hours. The cage is then removed and the solution filtered through a sulfur absorption tube of grade C porosity to remove solid particles. The solution is then passed through a Medalia-type viscometer at 25° C., the viscometer having been calibrated with toluene. The inherent viscosity is calculated by dividing the natural logarithm of the relative viscosity by the weight of the original sample. The relative viscosity is the ratio of the viscosity of the polymer solution to that of toluene.

The microstructures of the polymers are determined by dissolving a sample of the polymer in carbon disulfide to form a solution of 25 grams of polymer per liter of solution. Using a commercial infrared spectrometer the infrared spectrum of the solution (percent transmission) is then determined.

The percent of the total unsaturation present as trans 1,4- is calculated according to the following equation and consistent units: $\epsilon = E/tc$, where $\epsilon$ is extinction coefficient (liters-mols$^{-1}$-centimeters$^{-1}$); E is extinction (log$I_0/I$); $t$ is path length (centimeters); and $c$ is concentration (mols double bond/liter). The extinction is determined at the 10.35 micron band and the extinction coefficient is 146 (liters-mols$^{-1}$-centimeters$^{-1}$).

The percent of the total unsaturation present as 1,2- (or vinyl) is calculated according to the above equation, using 11.0 micron band and an extinction coefficient of 209 (liters-mols$^{-1}$-centimeters$^{-1}$).

The percent of the total unsaturation present as cis 1,4- is obtained by subtracting the trans 1,4- and 1,2- (vinyl) determined according to the above procedure from the theoretical unsaturation, assuming one double bond per each C$_4$ unit in the polymer.

The rubber compositions of this invention can have incorporated therein the various compounding materials, including reinforcing pigments such as carbon black, zinc oxide, magnesium carbonate, etc., and other fillers, sulfur, accelerators, and the novel peptizing or chemical plasticizing agents of this invention. Stocks from such compositions will be useful for footwear, extruded articles, tire carcasses, tire treads, and other mechanical goods.

The objects and advantages of this invention are further illustrated in the following examples, but it should be understood that the materials, conditions, and proportions used in these examples are only typical and should not be construed to limit this invention unduly.

*Example I*

A series of runs was made in which the effect of ferric stearate, alone or in conjunction with cumene hydroperoxide, on the breakdown in air of cis-polybutadiene was determined by mastication of the elastomer composition in a Brabender Plastograph. The ferric stearate used was a commercial product which analyzed 9.3 wt. percent Fe$^{+++}$ and 0.8 wt. percent Fe$^{++}$. The cis-polybutadiene employed was prepared by the polymerization of 1,3-butadiene in the presence of a catalyst system comprising triisobutylaluminum, titanium tetrachloride, and iodine. It was a gel free polymer that had a Mooney value (M1–4 at 212° F.) of 46.5, an inherent viscosity of 2.54, a cis content of 94.9 percent, a trans content of 2.0 percent, and a vinyl content of 3.1 percent.

The additives were milled into the polymer on a cool 2-inch roll mill before charging to the Plastograph. The jacket temperature of the Plastograph was regulated at 100° C. and the torque recorders set and zeroed. The polymer composition was cut into ribbons and fed into the mixing head as rapidly as possible with the mixer set at approximately 25 r.p.m. This operation required less than a minute. The charge weight to the Plastograph was 47 grams. The mixing was then started by starting the motor and setting the speed at 100 r.p.m. The torque (meter-kilograms) required to turn the rotors was noted and recorded at regular intervals. Total mixing time for each sample was 6 minutes. A simultaneous record of the temperature was also obtained. One control run was made without any additive and another control run made using a commercial peptizer, namely, Endor, which comprises iron phthalocyanine and the zinc salt of pentachlorothiophenol. Quantities of peptizer materials and final torque (a measure of breakdown) after 6 minutes are shown in Table I.

composition containing carbon black was determined by mastication of the elastomer composition in a Brabender Plastograph. The cis-polybutadiene and ferric stearate were the same as that used in Example I. The same procedure as that of Example I was followed except that the charge weight to the Plastograph was 57 grams and the polymer composition contained certain other ingredients shown in the recipe of Table II.

TABLE II

|   | Parts by weight |
|---|---|
| Cis-polybutadiene | 100 |
| High abrasion furnace black (Philblack 0) | 60 |
| Aromatic oil (Philrich 5) | 10 |
| Lauric acid | 2 |
| Peptizer | Variable |

The carbon black and other additives, including the peptizer ingredients where used, were milled into polymer on a cool 2-inch roll mill before charging into the Plastograph. The jacket temperature of the Plastograph was regulated at 65° C., mixing speed was 150 r.p.m. and the total mixing time was 6 min. Two control runs were made, one without any peptizer and the other with Endor. Results are shown in Table III.

TABLE III

| Run | Additive, phr. | Measurement | Mixing time, min. | | | | | | | |
|---|---|---|---|---|---|---|---|---|---|---|
| | | | 0 | 0.5 | 1 | 2 | 3 | 4 | 5 | 6 |
| 1 | None | Torque [a] | | 3.64 | 3.54 | 3.38 | 3.20 | 3.02 | 2.84 | 2.69 |
| | | Temp.[b] | 55 | 88 | 108 | 130 | 149 | 160 | 164 | 166 |
| 2 [c] | Cumene hydroperoxide, 0.15; Ferric stearate, 0.50. | Torque | | 3.47 | 3.17 | 2.91 | 2.72 | 2.55 | 2.43 | 2.32 |
| | | Temp | 57 | 99 | 118 | 136 | 146 | 153 | 159 | 163 |
| 3 | Endor, 1.0 | Torque | | 3.37 | 3.29 | 3.02 | 2.85 | 2.65 | 2.49 | 2.35 |
| | | Temp | 67 | 108 | 130 | 146 | 156 | 161 | 164 | 166 |

[a] Torque measurements are given in m.-kg.
[b] Temperature measurements are given in ° C.
[c] The peroxy oxygen amounted to 0.032 phr., the iron to 0.05 wt. percent and the iron/peroxy oxygen ratio was 3.3/1.

The data of Table III show that the combination of ferric stearate with cumene hydroperoxide increased the breakdown of the rubber and to some extent this was

TABLE I

| Run | Additive, phr. | Measurement | Mixing time, min. | | | | | | | |
|---|---|---|---|---|---|---|---|---|---|---|
| | | | 0 | 0.5 | 1 | 2 | 3 | 4 | 5 | 6 |
| 1 | None | Torque [a] | 2.06 | | 2.03 | 2.01 | 2.00 | 1.99 | 1.98 | 1.98 |
| | | Temp.[b] | 113 | | 133 | 142 | 148 | 153 | 156 | 157 |
| 2 | Cumene hydroperoxide, 0.15 [c] | Torque | | 2.11 | 2.08 | 2.06 | 2.06 | 2.05 | 2.03 | 2.00 |
| | | Temp | 95 | 115 | 128 | 137 | 145 | 151 | 154 | 157 |
| 3 | Ferric stearate, 0.50 | Torque | | 2.05 | 2.03 | 2.00 | 1.91 | 1.81 | 1.70 | 1.57 |
| | | Temp | 95 | 115 | 126 | 136 | 143 | 148 | 150 | 151 |
| 4 [d] | Cumene hydroperoxide, 0.1; [c] Ferric stearate, 0.50. | Torque | | 2.15 | 2.07 | 1.97 | 1.86 | 1.75 | 1.62 | 1.51 |
| | | Temp | 94 | 112 | 122 | 132 | 138 | 142 | 144 | 144 |
| 5 [d] | Cumene hydroperoxide, 0.15; [c] Ferric stearate, 0.50. | Torque | | 2.07 | 2.04 | 1.90 | 1.77 | 1.64 | 1.52 | 1.42 |
| | | Temp | 98 | 117 | 127 | 135 | 141 | 143 | 144 | 145 |
| 6 | Endor, 1.0 | Torque | | 2.07 | 2.05 | 2.00 | 1.92 | 1.83 | 1.71 | 1.58 |
| | | Temp | 104 | 121 | 131 | 141 | 147 | 151 | 152 | 152 |

[a] Torque measurements are given in m.-kg.
[b] Temperature measurements are given in ° C.
[c] The amounts of peroxy oxygen in 0.1 phr. and 0.15 phr. in cumene hydroperoxide are 0.02 phr. and 0.032 phr., respectively.
[d] The 0.50/0.1 wt. ratio and 0.50/0.15 wt. ratio of iron stearate to cumene hydroperoxide represent iron to peroxy oxygen weight ratios of 5/1 and 3.3/1, respectively.

The data of Table I show that ferric stearate is an effective peptizer, even better than the commercial peptizer, Endor. Using a combination of ferric stearate with organic peroxide resulted in further breakdown of the rubber, whereas the organic peroxide by itself did not significantly improve the breakdown.

*Example II*

The effect of a mixture of ferric stearate and cumene hydroperoxide on the breakdown of a cis-polybutadiene greater than that produced by the commercial peptizer, Endor.

*Example III*

The effect of combinations of ferric stearate with various organic peroxides on the breakdown of cis-polybutadiene in air was determined as in Example I using the same polymer and ferric stearate. The stocks were masticated in the Brabender Plastograph for 6 min. at 100 r.p.m. with a jacket temperature of 100° C. Results in terms of initial torque (0.5 min.) and final torque (6 min.) are set forth in Table IV.

conditions, Mooney values, milling character, and extrusion properties of these stocks are set forth in Table VI.

TABLE IV

| Run | Peroxide | | Amt. of ferric stearate, phr. | Wt. ratio of iron to peroxy oxygen | Torque, m.-kg. | |
|---|---|---|---|---|---|---|
| | Name | Amt., phr. | | | Initial | Final |
| 1 | None | 0 | 0.5 | 0 | 2.05 | 1.57 |
| 2 | Cumene hydroperoxide | 0.15 | 0.5 | 3.3/1 | 2.07 | 1.42 |
| 3 | Benzoyl peroxide | 0.15 | 0.5 | 5/1 | 2.16 | 1.46 |
| 4 | Tert-butyl hydroperoxide | 0.15 | 0.5 | 1.7/1 | 2.10 | 1.41 |
| 5 | p-(Tert-butyl) cumene hydroperoxide | 0.15 | 0.5 | 4.2/1 | 2.12 | 1.39 |
| 6 | p-Menthane hydroperoxide | 0.15 | 0.5 | 3.6/1 | 2.14 | 1.43 |
| 7 | Phenylcyclohexyl hydroperoxide | 0.15 | 0.5 | 4.2/1 | 2.14 | 1.40 |

The data of Table IV show that further breakdown of the rubber can be accomplished when the ferric stearate is combined with an organic peroxide.

Example IV

The effect of a combination of ferric stearate with cumene hydroperoxide on the breakdown of cis-polybutadiene gum and carbon black stocks in a Midget Banbury mixer was determined in this example. The cis-polybutadiene and ferric stearate used were the same as that in Example I. Control runs without any additive and with Endor were also made for comparison. Table V shows the composition of the stocks employed, mixing conditions, milling character and Mooney values of the several products.

TABLE V

| Runs | 1 | 2 | 3 | 4 | 5 |
|---|---|---|---|---|---|
| Composition (parts by wt.): | | | | | |
| Cis-polybutadiene | 100 | 100 | 100 | 100 | 100 |
| High abrasion furnace black a | 0 | 0 | 60 | 60 | 60 |
| Aromatic oil (Philrich 5) | 0 | 0 | 10 | 10 | 10 |
| Lauric acid | 0 | 0 | 2 | 2 | 2 |
| Iron stearate | 0 | 0.5 | 0 | 0 | 0.5 |
| Cumene hydroperoxide | 0 | 0.15 | 0 | 0 | 0.15 |
| Endor | 0 | 0 | 0 | 2 | 0 |
| Mixing conditions: | | | | | |
| Mixing speed, r.p.m. | 100 | 100 | 100 | 100 | 100 |
| Mixing time, min. | 7 | 7 | 7 | 7 | 7 |
| Jacket temp., °F | 190 | 190 | 190 | 190 | 190 |
| Dump temp., °F | 290 | 280 | 290 | 295 | 310 |
| Milling character (at 158° F.) | (b) | (c) | (d) | (d) | (e) |
| Mooney values: | | | | | |
| Raw (ML-4 at 212° F.) | 43 | 20 | | | |
| Compounded (MS-1½ at 212° F.) | | | 54 | 51.5 | 43 | a Philblack 0.
b No band.
c Tight band.
d Band loose at top.

The data of Table V show that satisfactory breakdown of the stocks can be obtained in the Midget Banbury mixer. The ferric stearate/cumene hydroperoxide combination peptizer was more effective in the carbon black stocks than the commercial peptizer, Endor.

Example V

Three cis-polybutadiene carbon black stocks were mixed in a B Banbury mixer. These stocks contained 60 phr. high abrasion furnace black (Philblack 0), 10 phr. aromatic oil (Philrich 5), 2 phr. lauric acid, and 3 phr. zinc oxide. One stock contained a combination of ferric stearate and cumene hydroperoxide peptizing agent, one stock contained Endor, and the third stock was a control which does not contain any peptizer. The cis-polybutadiene and ferric stearate used were the same as that of Example I. The composition of the stocks, mixing

TABLE VI

| Runs | 1 | 2 | 3 |
|---|---|---|---|
| Composition (parts by wt.): | | | |
| Cis-polybutadiene masterbatch | 172 | 172 | 172 |
| Iron stearate | 0 | 0.5 | 0 |
| Cumene hydroperoxide | 0 | 0.15 | 0 |
| Endor | 0 | 0 | 2 |
| Mixing conditions: | | | |
| Mixing time, min.a | 8 | 8 | 8 |
| Dump temp., °F | 355 | 380 | 360 |
| Milling character (at 158° F.) | (b) | (c) | (b) |
| Compounded Mooney value (MS-1½ at 212° F.) | 46 | 36 | 44 |
| Extrusion properties at 250° F.: d | | | |
| Inches/min | 28.3 | 36.4 | 24.3 |
| Grams/min | 69.0 | 86.5 | 66.0 |
| Rating | 12− | 12 | 8+ | a From 3 min. to end of run the ram was raised and lowered quickly at 20 sec. intervals.
b Band loose at top.
c Tight band.
d No. ½ Royle Extruder with Garvey die. See Ind. Eng. Chem. 34, 1309 (1942). As regards the "rating" figure, 12 designates an extruded product considered to be perfectly formed whereas lower numerals indicate less perfect products.

The data of Table VI shows definitely improved breakdown of the stock peptized with the ferric stearate/cumene hydroperoxide peptizing combination, this stock also having better handling properties than that stock containing the Endor peptizer or the control stock.

Example VI

Stock from Run 2 of Table VI and an unmasticated sample of the cis-polybutadiene were compounded using the recipe shown in Table VII.

TABLE VII

| Runs | 1 | 2 |
|---|---|---|
| Composition, parts by wt.: | | |
| Cis-polybutadiene masterbatch a | 175.65 | 0 |
| Cis-polybutadiene | 0 | 100 |
| High abrasion furnace black b | 0 | 60 |
| Aromatic oil (Philrich 5) | 0 | 10 |
| Lauric acid | 0 | 2 |
| Zinc oxide | 3 | 3 |
| Stearic acid | 2 | 2 |
| Sulfur | 1.6 | 1.6 |
| Santocure c | 1 | 1 |
| Flexamine d | 1 | 1 | a Composition from Run 2 of Table VI.
b Philblack 0.
c N-cyclohexyl-2-benzothiazolesulfenamide.
d Physical mixture containing 65% of a complex diarylamine-ketone reaction product and 35% of N,N'-diphenyl-p-phenylenediamine.

The stocks shown in Table VII were milled on a roll mill, cured 40 min. at 307° F., and the physical properties determined. These properties are set forth in Table VII. The property "$\nu \times 10^4$," is the number of effective network chains per unit volume of rubber, the higher the number the more the rubber is crosslinked (vulcanized), this property being determined by the swelling method of Kraus, as given in Rubber World, 135, 67–73, 254–260 (1956). The properties termed "300% Modulus," "Tensile" and "Elongation," were determined on a Model TM Instron Tensile Machine, wherein the rubber specimens (0.020 x 0.125 inch) were pulled from a 2-inch gage length at a crosshead speed of 20 inches/min. at room temperature; the rubber specimens were marked with marks 1 inch apart and the 300% modulus was obtained by noting the strain of the sample when the marks were 4 inches apart (300% elongation). The property termed "Shore hardness" was determined by ASTM D 676–55T on a Short Durometer, Type A. The property termed "Resilience" was determined according to ASTM D–945–55 (modified), using a Yerzley oscillograph, with right circular cylinder specimens 0.7 inch in diameter and 1 inch high. The property termed "ΔT" (heat buildup) was determined according to ASTM D 623–52T, Method A, using a Goodrich Flexometer, 143 lbs./sq. in. load, 0.175 inch stroke, with right circular cylinder test specimens measuring 0.7 inch in diameter and 1 inch in height.

TABLE VIII

| Runs a | 1 | 2 |
|---|---|---|
| Properties: | | |
| $\nu \times 10^4$, moles/cc | 2.16 | 2.11 |
| 300% modulus, p.s.i | 1,770 | 1,590 |
| Tensile, p.s.i | 2,760 | 2,390 |
| Elongation, percent | 430 | 420 |
| Shore A hardness | 63 | 66 |
| ΔT, °F | 49 | 61.5 |
| Resilience, percent | 77 | 71 | a These runs correspond to those of Table VII.

The data of Table VIII show that the peptized stock (Run 1) had better properties (higher modulus, higher tensile, higher resilience, and lower heat buildup) than the unpeptized stock.

*Example VII*

In this example, the effects of ferric stearate alone and in combination with cumene hydroperoxide on the breakdown of natural rubber (#1 Smoked Sheet), a butadiene/rubber (SBR–1500), and polybutadiene (prepared using butyllithium as the initiator and having less than 50% cis configuration) were determined, using the procedure of Example I. Control runs were made of each rubber using no additives. Results are set forth in Table IX.

understood that this invention is not to be limited unduly to that set forth herein for illustrative purposes.

I claim:

1. In the process of mastimating a rubber selected from the group consisting of natural rubber and rubbery polymers of conjugated dienes, the improvement comprising incorporating an iron salt of a faty acid into said selected rubber as a peptizing agent, and an organic peroxide in an amount sufficient to enhance the peptizing action of said iron salt.

2. In the process of masticating a rubbery polymer of 1,3-butadiene, the improvement comprising incorporating an iron salt of a fatty acid into said selected rubber as a peptizing agent in an amount sufficient to enhance the breakdown of said rubbery polymer, and an organic peroxide in an amount sufficient to enhance the peptizing action of said iron salt.

3. The process according to claim 2 wherein said fatty acid has 8 to 30 carbon atoms per molecule.

4. The process according to claim 2 wherein said fatty acid has 8 to 20 carbon atoms per molecule.

5. The process according to claim 2 wherein said fatty acid has 18 carbon atoms per molecule.

6. The process according to claim 2 wherein said fatty acid is stearic acid.

7. The process according to claim 2 wherein said rubbery polymer is cis-polybutadiene.

8. In the process of masticating cis-polybutadiene, the improvement comprising incorporating iron stearate into said cis-polybutadiene as a peptizing agent in an amount sufficient to enhance the breakdown of said cis-polybutadiene, and an organic peroxide in an amount sufficient to enhance the peptizing action of said iron salt.

9. The process according to claim 8 wherein said organic peroxide is cumene hydroperoxide.

10. As a new composition of matter, a rubber selected from the group consisting of natural rubber and rubbery polymers of conjugated dienes, said selected rubber having incorporated therein a minor amount of an iron salt of a fatty acid and a minor amount of an organic peroxide, said amounts collectively being effective to improve the breakdown properties of the rubber.

11. As a new composition of matter, a rubbery polymer of 1,3-butadiene having incorporated therein a minor amount of an iron salt of a fatty acid and a minor amount of an organic peroxide, said amounts collectively being

TABLE IX

| Run | Rubber | Amt. of additive | | Measurements a | | | |
| | | Ferric stearate, phr. | Cumene hydroperoxide, phr. | 0.5 min. | | 6 min. | |
| | | | | Torque | Temp. | Torque | Temp. |
|---|---|---|---|---|---|---|---|
| 1 | Natural | 0 | 0 | 2.02 | 101 | 1.66 | 143 |
| 2 | do | 0.5 | 0 | 2.00 | 108 | 0.98 | 136 |
| 3 | do | 0.5 | 0.15 | 1.92 | 108 | 1.20 | 143 |
| 4 | Butadiene/styrene | 0 | 0 | 2.49 | 108 | 1.78 | 146 |
| 5 | do | 0.5 | 0 | 2.37 | 108 | 1.42 | 138 |
| 6 | do | 0.5 | 0.15 | 2.10 | 112 | 1.66 | 149 |
| 7 | Polybutadiene | 0 | 0 | 2.12 | 118 | 1.46 | 145 |
| 8 | do | 0.5 | 0 | 2.44 | 111 | 1.37 | 142 |
| 9 | do | 0.5 | 0.15 | 2.20 | 122 | 1.97 | 153 | a Torque measurements are given in m.-kg., and temp. measurements in °C.

The data of Table IX show that ferric stearate is an effective peptizer for all three types of rubber, but the breakdown of the rubbers using a combination of ferric stearate with cumene hydroperoxide was not as marked in the case of natural and butadiene/styrene rubbers and inferior in the case of the polybutadiene.

Various modifications and alterations of this invention will become apparent to those skilled in the art from the foregoing discussion and examples, and it should be effective to improve the breakdown properties of the rubbery polymer.

12. As a new composition of matter, cis-polybutadiene having incorporated therein a minor amount of iron stearate and a minor amount of an organic peroxide, said amounts collectively being effective to improve the breakdown properties of the rubbery polymer.

13. As a new composition of matter, cis-polybutadiene having incorporated therein a minor amount of iron stearate and a minor amount of cumene hydroperoxide, said amounts collectively being effective to improve the breakdown properties of the rubbery polymer.

14. The method according to claim 2 wherein said organic peroxide is cumene hydroperoxide.

References Cited by the Examiner

UNITED STATES PATENTS

| | | | |
|---|---|---|---|
| 2,153,141 | 4/1939 | Engel | 260—761 |
| 2,590,059 | 3/1952 | Winkler | 260—23 |
| 2,676,944 | 4/1954 | Doak | 260—23.7 |
| 2,784,167 | 3/1957 | Schneider et al. | 260—23.7 |
| 2,860,116 | 11/1958 | Pikl | 260—761 |
| 3,004,018 | 10/1961 | Naylor | 260—94.3 |

OTHER REFERENCES

Albert et al., Industrial and Engineering Chemistry (1948), vol. 40, pp. 482–487 (copy in Scientific Library).

Morton, "Introduction to Rubber Technology" (1959), pp. 151–157 (copy in Scientific Library).

"Compounding Ingredients for Rubber" (1947), pp. 126, 132, 164 and 256 (copy in Scientific Library). 208, 209 (copy in Scientific Library).

LEON J. BERCOVITZ, *Primary Examiner.*

RALPH A. WHITE, *Assistant Examiner.*